March 17, 1964     C. ARBTER     3,125,261
DEVICE FOR TURNING POCKET-LIKE ARTICLES
Filed Jan. 9, 1963
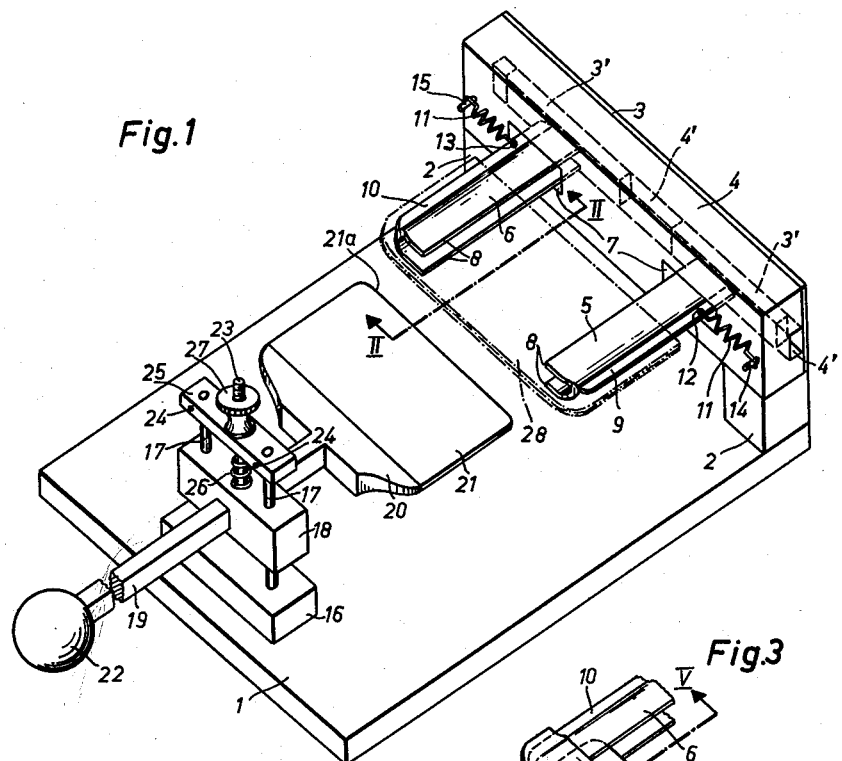
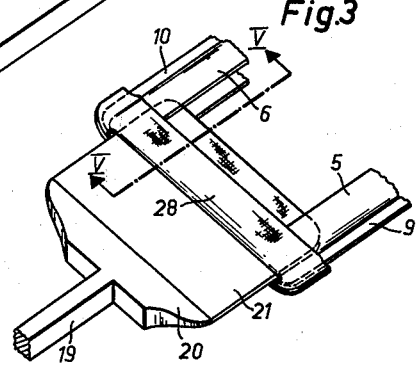
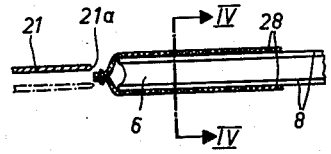
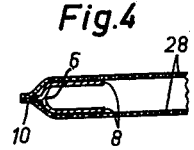
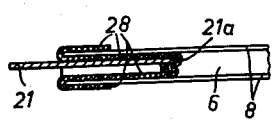
INVENTOR.
CONRAD ARBTER
BY
*YWMan*
ATTORNEY

United States Patent Office 3,125,261
Patented Mar. 17, 1964

3,125,261
DEVICE FOR TURNING POCKET-LIKE ARTICLES
Conrad Arbter, Saal (Saale), Germany, assignor to G. M. Pfaff A.G., Kaiserslautern, Pfalz, Germany, a corporation of Germany
Filed Jan. 9, 1963, Ser. No. 250,188
Claims priority, application Germany Jan. 11, 1962
8 Claims. (Cl. 223—39)

The present invention relates to devices for turning inside out pocket-like articles or work pieces consisting of edge-sewn superposed fabric or the like layers, such as cuffs, collars, pocket flaps, and the like, more particularly to devices or apparatus of this type comprising a pair of oblong parallel turning guides or members having a U-shaped cross-section, said members being arranged with the open ends of the U's facing one another and being provided with parallel guide and resilient biasing means, to urge the same in a direction away from one another, in such a manner as to enable the mounting thereon in stretched condition of a pocket-like work piece to be turned. The devices further comprise a turning plate arranged with its opposite edges engaging the inside of and to move within said members for the turning of a work piece placed or mounted thereon by insertion of said plate also being supported by suitable guide and mounting means.

In the operation of devices of the foregoing type, especially for use in turning or reversing laundry pieces, cuffs, pocket flaps, and the like, it is of major importance to so stretch and turn the pieces or articles as to cause the same to emerge from the turning apparatus in the proper final shape or condition, or to avoid the necessity of making readjustments, corrections, etc. during or after the turning or folding process.

Accordingly, an important object of the present invention is the provision of improved fabric turning apparatus of the type referred to, especially, though not limitatively, for use in connection with automatic turning operations, by which the prior and related difficulties are substantially overcome and which will insure folding or turning of the pieces efficiently and accurately about the edge seams thereof or along the contours of the turning guides or members.

Another object of the invention is the provision of fabric turning mechanism of the type referred to which can be utilized with equal advantage in connection with different types of work pieces, including simple cuffs, turned-up cuffs, and the like parts or articles. As is well known, in the case of simple cuffs the fabric layer initially overlying the upper surface of the turning guides, that is prior to the turning process, also forms the upper layer of the cuff or equivalent article after turning, while in the case of turned-up cuffs the opposite relation obtains in that the final upper fabric layer is initially positioned adjacent to the lower surface of the turning guides or members. The purpose of the turning of the pieces inside out is to improve the appearance of the finished garments by concealing as far as possible any seams or sewn edges, it being understood that accurate folding or turning must be insured along the sewn edges or seams of the pieces in order not to defeat the very purpose and object of the folding or turning operations.

The invention, both as to its ancillary objects as well as novel aspects, will be better understood from the following detailed description of a preferred practical embodiment, taken in conjunction with the accompanying drawing forming part of this specification and in which:

FIG. 1 is a perspective view of a fabric turning device constructed in accordance with the principles of the invention, the parts being shown in the position prior to the commencement of a turning operation;

FIG. 2 is a sectional view taken on line II—II of FIG. 1;

FIG. 3 is a partial perspective view showing the reversing tools of the device in the position midway during a fabric turning operation;

FIG. 4 is a sectional view taken on line IV—IV of FIG. 2; and

FIG. 5 is a sectional view taken on line V—V of FIG. 3.

Like reference numerals denote like parts or elements in the different views of the drawing.

With the foregoing objects in view, the invention involves essentially the provision, in connection with a fabric turning device of the general type referred to, of auxiliary longitudinal guide or aligning means in the form of guide ridges or projections coinciding with the symmetry plane of and extending outwardly from the connecting portions of the U-shaped turning guides or members, said ridges or projections being so designed or dimensioned as to cooperate with the edge seams of the work pieces or articles being turned to align and guide the same such as to effect turning or folding inside out substantially about said seams and without necessitating any re-adjustments, corrections, etc. during or after the turning operations.

According to an improved feature of the invention, the position or plane of movement of the turning plate in relation to the guide members is variable in order to adjust said plate in varying relative positions within the U-shaped guide members, substantially without impairing or interfering with the proper guidance of the cuff or equivalent pieces during the turning operations.

As an example, it is possible in this manner to cause the front edge of the turning plate to adjoin either of the upper or lower leg portions of the guides, or to engage either of the layers of the cuff during the turning process, respectively. As a result of the friction, during the movement of the plate between the fabric and the legs of the turning members, the seam will be forced around the fabric folding edge produced at the front edge of the turning plate, whereby to conceal the seam from the outside of the cuff in the finished garment and to greatly improve the appearance thereof, as will become further apparent as the following description of the drawing proceeds.

Referring more particularly to FIG. 1, the numeral 2 indicates a pair of spacing or bearing blocks mounted upon a base 1 and supporting a casing 4 closed by a rear cover or plate 3. Mounted within the casing 4 are a pair of parallel and relatively displaceable turning guides or members 5 and 6 of U-shaped cross-section and arranged with the open ends of the U's facing one another. The members 5 and 6 projecting through openings or recesses 7 of the casing 4 have one end supported within the latter by any suitable parallel guide and mounting means indicated in the drawing in the form of guide plates 3' projecting laterally from said members and moving within corresponding guides or passageways 4', similar guide means being advantageously provided upon the underside of the members. As will be understood, any other known parallel guide or operating arrangement for the U-shaped turning members 5 and 6 may be provided for the purpose of the invention. The members 5 and 6 are resiliently biased in the direction away from one another by any suitable means, such as by the provision of a pair of tension springs 11 having one end secured to the members, as at 12 and 13, and having their opposite ends secured to or held by pins 14 and 15, respectively, projecting from the casing 4 in accordance with the example illustrated in the drawing. Furthermore, in accordance with the present invention, the members 5 and 6 are fitted with longitudinal lateral ridges or projections 9 and 10, respectively, disposed in the symmetry plane of and projecting outwardly from the members, for guiding and aligning the pocket-like work pieces during a folding or turning operation in the manner further described hereafter.

Further mounted upon the base 1, at a point spaced from the casing 4 and guide members 5 and 6, is a plate 16 to which are secured a pair of vertical guide rods 17. Slidably mounted upon the rods 17 is a vertical guide member 18 which advantageously may consist of metal sheet and, in turn, supports a horizontally slidable operating rod or bar 19 having its outer end fitted with a spherical or the like operating knob or member 22 and carrying at its opposite end a mount 20 for a turning plate 21 adapted to cooperate with the members 5 and 6 for the turning inside out of a pocket-like work piece 28 indicated in dot-dash lines and described in greater detail presently.

Plate 21 may be operated either manually by means of the knob 22 or the turning operation may be effected automatically such as by the aid of a cam or the like operating mechanism imparting reciprocating motion to the rod 19, in a manner readily understood. The plate 21 may be advantageously removably mounted upon the carrier 20 for exchange with plates of different shape and/or size, to suit any existing operating conditions or requirements.

Secured to the guide member 18 is a vertical threaded bolt or pin 23 being passed through a plate 25 which is secured to the upper ends of the guide rods 17 by means of securing pins or rivets 24 or in any other suitable manner. A compression spring 26 encircling the bolt 23 has one end arranged to engage the guide member 18 and has its opposite end arranged to engage the plate 25, while a knurled nut 27 engages the threaded upper end of the bolt 23 for effecting the vertical adjustment of the plate 21 for the purpose as will become more apparent from the following description of the operation of the fabric turning device shown by the drawing.

The cuffs or the like pocket-like work piece or article 28 consisting of a plurality of fabric or the like layers sewn together along three edges is placed or mounted in stretched condition upon the turning guides or members 5 and 6 by first operating the guides towards one another against the action of the springs 11, in such a manner as to cause the lateral projections or ridges 9 and 10 to locate the cuff or its lateral seams, as shown in FIGS. 1, 2 and 4, the springs 11, upon release of the members 5 and 6, maintaining the cuff in properly stretched position or alignment.

The operating rod 19 is then displaced inwardly in the direction towards the cuff 28 and members 5 and 6, FIG. 3, either manually by the aid of the knob 22, or automatically, whereby to cause the front edge 21a of the plate 21 conforming to the shape and size of the cuff to engage the latter either above or below the center of the seam, depending upon the vertical position or adjustment of guide member 18, FIGS. 2 and 5. As a consequence, the cuff is turned inside out during the penetration of the plate 21 into or engagement with the legs or walls 8 of the members 5 and 6, FIGS. 3 and 5. During the turning-over process, the lateral seams of the cuff are drawn along the edges of the projections or ridges 9 and 10 acting as guides by virtue of the fact that the seams due to their inherent elasticity constitute the most yielding parts of the multi-layer work piece. As a consequence, accurate and secure guidance of the cuff 18 by the further action of the springs 11 is maintained in this manner securely and efficiently or, in other words, rotation or displacement of the cuff is substantially prevented during the inside out turning or reversing operation.

Upon completion of the turning operation, the cuff 28 is mounted upon or held by the turning plate 21 from which it may be withdrawn after retracting the plate to its initial or starting position, FIG. 1, by operation of the knob 22 in the opposite or outward direction.

The vertical adjustment of the plate 21, as indicated in dot-dash lines in FIG. 2, may be effected by rotating the knurled nut 27, FIG. 1 to suit existing conditions or operating requirements.

In the foregoing the invention has been described in reference to a specific illustrative device. It will be evident, however, that variations and modifications, as well as the substitution of equivalent parts or elements for those shown herein for illustration, may be made in accordance with the broader scope and spirit of the invention as defined by the appended claims. The specification and drawing is intended, therefore, to be regarded in an illustrative rather than in a restrictive sense.

I claim:

1. A device for turning inside out pocket-like work pieces consisting of superposed edge-sewn fabric or the like layers comprising a pair of parallel oblong turning members of U-shaped cross-section, said members each having a pair of leg portions and a connecting portion and arranged with the open ends of the U's facing one another, parallel guide and resilient biasing means to urge said members away from one another and to enable the mounting thereon in stretched condition of a pocket-like work piece to be turned, longitudinal aligning ridges coinciding with the symmetry plane of and projecting outwardly from the connecting portions of said members, and a turning plate adapted to have its opposite edges engage the inside of and to move within said members for turning a work piece placed thereon, said ridges being adapted to cooperate with the edge seams of said work piece to align and guide the same such as to effect turning thereof about said seams during a work turning operation.

2. A device as claimed in claim 1, including further guide means to maintain said plate in a position parallel to said members during a work turning operation.

3. A device as claimed in claim 1, including further guide means to maintain said plate in a position parallel to said members during a work turning operation, and means operably associated with said last-mentioned means to adjust said plate between two positions of adjoining either of the leg portions of said members.

4. A device for turning inside out pocket-like work pieces consisting of superposed edge-sewn fabric and the like layers comprising a support, a pair of parallel oblong turning members of U-shaped cross-section, said members each having a pair of leg portions and a connecting portion and arranged with the open ends of the U's facing one another, parallel guide and mounting means for said members carried by said support, spring biasing means to urge said members away from one another and to enable the mounting thereon in stretched condition of a pocket-like work piece to be turned, longitudinal aligning ridges coinciding with the symmetry plane of and projecting outwardly from the connecting portions of said members, a turning plate adapted to have its opposite edges engage the inside of and to move within said members, for turning inside out a work piece mounted thereon, and further guide and operating means mounted upon said support to displace said plate parallel to and within said members for effecting a work turning operation, said ridges being adapted to cooperate with the adjoining edge seams of said work piece such as to align and guide the same and to effect turning thereof about said seams during a work turning operation.

5. A device as claimed in claim 4, including further means operably associated with said last-mentioned means to adjust said plate between two positions of adjoining either of the leg portions of said members.

6. A device for turning inside out pocket-like work pieces consisting of edge-sewn superposed fabric or the like layers comprising a base, a first support carried by said base, a pair of oblong parallel turning members of U-shaped cross-section, said members each having a pair of leg portions and a connecting portion and arranged with the open ends of the U's facing one another, parallel guide and mounting means carried by said support and supporting one end of said members with the remaining parts of the members projecting outwardly from said support, spring means to urge said members away from one another and to enable the mounting thereon in stretched condition of a pocket-like work piece to be turned, longitudinal aligning ridges coinciding with the symmetry plane of and projecting outwardly from the connecting portions of said members, a turning plate adapted to have its opposite edges engage the inside of and to move within said members acting as guides, for turning inside out a work piece mounted upon said members, a second support upon said plate, and parallel guide and operating means movably mounted upon said second support and carrying said plate, to move said plate parallel to and within said members for effecting a work turning operation, said ridges being adapted to cooperate with the adjoining edges of said work piece to align and guide the same such as to effect turning thereof about said seams during a work turning operation.

7. In a device as claimed in claim 6, said last-mentioned means being comprised of a further guide member having a guide slot, and an operating bar movable within said slot and carrying said plate.

8. In a device as claimed in claim 6, said last-mentioned means comprised of a further guide member having a guide slot, an operating bar movable within said slot and carrying said plate, and means to operate said further guide member in a direction transverse to the movement of said bar, to adjust said plate between two positions adjoining either of the leg portions of said members.

References Cited in the file of this patent
UNITED STATES PATENTS
2,864,539     Parrilla _____ Dec. 16, 1958